(12) United States Patent
Schlansker et al.

(10) Patent No.: US 8,131,814 B1
(45) Date of Patent: Mar. 6, 2012

(54) DYNAMIC PINNING REMOTE DIRECT MEMORY ACCESS

(75) Inventors: Michael Schlansker, Los Altos, CA (US); Christian Bell, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 183 days.

(21) Appl. No.: 12/252,173

(22) Filed: Oct. 15, 2008

Related U.S. Application Data (60) Provisional application No. 61/079,857, filed on Jul. 11, 2008.

(51) Int. Cl.
*G06F 15/167* (2006.01)
(52) U.S. Cl. .......................... 709/212; 709/250; 711/170
(58) Field of Classification Search .................. 709/223, 709/212, 250; 711/212
See application file for complete search history.

(56) References Cited

U.S. PATENT DOCUMENTS

2008/0082696 A1* 4/2008 Bestler .......................... 709/250
2009/0157995 A1* 6/2009 Kalmuk et al. ................ 711/170

OTHER PUBLICATIONS

Sur, S. et al., "High-Performance and Scalable MPI over InfiniBand Evaluation of M-VIA on AceNIC Gigabit Ethernet Card". Aug. 2003.*
Binkert, n. J. et al., "Integrated Network Interfaces for High-Bandwidth TCP/IP", ASPLOS '06. ACM, Oct. 2006.*
Balaj, P. et al., "Head-to-TOE Evaluation of High-Performance Sockets over Protocal Offload Engines", Technical Report, 2005.
Binkert, N. et al., "Integrated Network Interfaces for High-Bandwidth TCP/IP", ASPLOS'06, ACM, Oct. 2006.
Boden, N.J. et al., "Myrinet—A Gigabit-per-Second Local-Area Network", IEEE Micro, Feb. 1995.
Cherkasova, L. et al., "Fibre Channel Fabrics: Evaluation and Design", 29th Annual Hawaii International Conf. on System Sciences, 1996.
Dalton, C. et al., "Afterburner [network-independent card for protocals]", IEEE Network, Jul. 1993, Abstract only.
Dunning, D. et al., "The Virtual Interface Architecture", IEEE Micro, Mar./Apr. 1998, Abstract only.
Gilfeather, P. et al., "Making TCP Viable as a High Performance Computing Protocal", Abstract only.
Kung, H.T. et al., "Credit-Based Flow Control for ATM Networks", IEEE Network Magazine, Mar. 1995.
Liu, J. et al., "High Performance RDMA Based MPI Implementation over InfiniBand", Jun. 2004.
Liu, J. et al., "Micro-Benchmark Level Performance Comparison of High-Speed Cluster Interconnects", Jan./Feb. 2004.
Minkerberg, C. et al., "Speculative Flow Control for High-Radix Datacenter Interconnect Routers", IPDPS, IEEE International, Mar. 2007, Abstract only.
Mukherjee, S.S. et al., "Coherent Network Interfaces for Fine-Grain Communication", 23rd International Symposium on Computer Architecture, 1996.
Park, S. et al., "mplementation and performance study of a hardware-VIA-based network adapter on gigabit ethernet", Journal of Systems Architecture, Nov. 2005, Abstract only.
Petrini, F. et al., "The Quadrics Network: High-Performance Clustering Technology", IEEE Feb. 2002.

(Continued)

*Primary Examiner* — Tammy Nguyen (57) ABSTRACT

A dynamic pinning remote direct memory access is performed by creating sections of data to be transferred through a remote direct memory access. Each section includes a subset of the data to be transferred or received. To perform the remote direct memory access, each section is pinned, used for the remote direct memory access, and released after the transfer is complete.

13 Claims, 5 Drawing Sheets

OTHER PUBLICATIONS

Regnier, G. et al., "TCP Onloading for Data Center Servers", Computer, vol. 37, Issue 11, Nov. 2004, Abstract only.

Snir, M. et al., "MPI: The Complete Reference", MIT Press, 1998.

Sur, S. et al., "Shared receive queue based scalable MPI design for InfiniBand clusters", IPDPS 2006, IEEE, Apr. 2006, Abstract only.

Sur, S. et al., "High-Performance and Scalable MPI over InfiniBand with Reduced Memory Usage: An In-Depth performance Analysis", ACM/IEEE 2006, Abstract only.

Yoon, I. et al., "Implementation and Performance Evaluation of M-VIA on AceNIC Gigabit Ethernet Card", Aug. 2003.

* cited by examiner

DYNAMIC PINNING REMOTE DIRECT MEMORY ACCESS

CROSS REFERENCE TO RELATED APPLICATIONS

This Application claims the benefit of U.S. Provisional Application Ser. No. 61/079,857, filed Jul. 11, 2008, titled "Dynamic Pinning Remote Direct Memory Access."

BACKGROUND

Remote Direct Memory Access (RDMA) is an existing standard that supports one-sided memory-transfer operations that access data within user buffers. RDMA is a computer-to-computer transfer of data. Data is transmitted from the memory of one computer to the memory of another computer typically over a network. This is unlike direct memory access which is a memory access that is performed internally in a single computer.

RDMA provides for "zero-copy" networking, which lets a network interface controller (NIC) in a computer transfer data directly to or from system memory, eliminating the need to copy data between system memory and the kernel in the operating system (OS). This permits high-throughput, low-latency networking, which is especially useful for clustering and storage in data centers. Note that "zero-copy" is sometimes referred to as copy free. Also note that RDMA provides for autonomous data transfer as well as copy free. Autonomous means that a remote process is not interrupted while an RDMA get or put is in process.

RDMA was first implemented for InfiniBand followed by an iWARP implementation for Ethernet. In these implementations, RDMA involves two steps: registration and the actual put or get (i.e., write or read, respectively). Registration prepares a virtual buffer for RDMA. To register a buffer, a task or application makes a system call into a kernel component of the RDMA service. The kernel initializes the control data and creates a handle that encodes buffer access rights. It then swaps in and pins all buffer pages. The kernel component sends the NIC the mapping between the handle and the pinned physical pages and waits for a reply. In other words, the NIC gets a mapping of the virtual-to-physical addresses of the virtual buffer, and the kernel pins all the pages. Finally, the buffer handle is passed back to the local user process, which in turn sends it to a remote process on another computer system to be used in a subsequent RDMA get or put request.

This registration procedure is not only very expensive, in terms of CPU cycles, but it also pre-pins all pages regardless of how far in the future they are needed for RDMA. The pre-pinning operation is performed to make sure that the memory area involved in the communications will be kept in main memory, at least during the duration of the transfer. This approach facilitates OS-bypass, because RDMA includes direct access to application data without disturbing the OS. However, this approach wastes physical memory, and the total size of registered buffers cannot exceed the physical memory size. This leads to several major drawbacks.

One major drawback is that the pre-pinning of pages may cause the OS to crash due to lack of available memory. For example, if many processes on a local computer are registering a virtual buffer for an RDMA, it results in pinning a large amount of the system memory, even if the pinned pages are not going to be used for a significant number of cycles. This may result in reducing the amount of available memory below an amount needed by OS to operate, resulting in the OS crashing.

Another drawback is that it complicates software, as programmers must tune applications to work with a known amount of physical memory. While this may be reasonable for high-performance computing, it is less desirable within data centers. Such tuning affects portability as applications which run well on one platform may not execute on machines with less physical memory. It is hard to time-multiplex complex applications as RDMA memory is not virtualized and physical memory constraints must be jointly satisfied across all processes.

BRIEF DESCRIPTION OF DRAWINGS

The embodiments of the invention will be described in detail in the following description with reference to the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to embodiment, dynamic pinning RDMA (DP RDMA) is performed to transfer data between computing nodes. Pinning is the process of ensuring pages are resident in predetermined physical memory locations and cannot be swapped out of those locations at least for the duration of a transfer of data, such as for the duration of a copy. This may include providing an indication in a page table that these pages are pinned, so the OS or some other process does not move those pages.

DP RDMA decomposes data to be transferred through an RDMA into local and remote sections. Each local section is a subset of the memory region that receives data that is transferred for example, in response to an RDMA get or put request. Each remote section is a subset of the memory region that provides data that is sent when data is transferred for example, in response to an RDMA get or put request.

Decomposing into local and remote sections on both the receiving and sending side of a transfer includes determining the size of each section. The local and remote sections are transferred consecutively, and each local or remote section is pinned for the time needed to transfer the section. A receive side node pins physical memory for storing only the subset of the data for the local section when it is received. Then, the pinned local section is released on the receive side. The send side node pins physical memory only for the remote section that is currently being sent to the receive side node. Then, the pinned remote section is released on the send side. Local and remote sections are processed sequentially until all the data for the request is transferred.

DP RDMA limits pinning to smaller portions of data rather than for all the data for the request and only for the time needed to perform the transfer, the amount of available memory in each computing node is conserved. This alleviates significant resource limitations that would otherwise occur when pages are physically registered by a user program and pinned even when not being used. Multiple user programs can now utilize RDMA to access unpinned user buffers without concern for significantly reducing the amount of available physical memory.

According to an embodiment, a DP RDMA is performed using a helper (referred to as the DP RDMA helper) running within an operating system kernel. In a multi-core computer system, the DP RDMA helper may be dedicated to run on one or more of the processors, such as one of the cores or CPUs on a multi-core chip. The DP RDMA helper performs virtual-to-physical address translation and dynamically pins the needed pages just prior to buffer access and unpins, i.e., releases, pages just after access, as described above. Thus, user buffers are pinned only transiently and within the kernel. Also, by running the DP RDMA helper on a processor running the OS, the virtual-to-physical address mapping is known and the translation can easily be performed. Thus, the virtual-to-physical address mapping need not be sent to, and stored within, a network interface card (NIC) performing the DMA for the computing node.

Also, a swapper is configured to retrieve data, e.g., memory pages, not in the predetermined memory locations and place the data in those memory locations, so the data can be transferred in an RDMA. The swapper and the DP RDMA helper may be processes running in the kernel. It is important that the DP RDMA process is not blocked or halted while waiting for a page to swap in. This ensures that DP RDMA processing continues for the multiple user tasks that are serviced by the DP RDMA helper. By using the swapper, the DP RDMA helper processing proceeds in an uninterrupted manner, and only the swapper task waits for pages to swap in.

Figure 1:
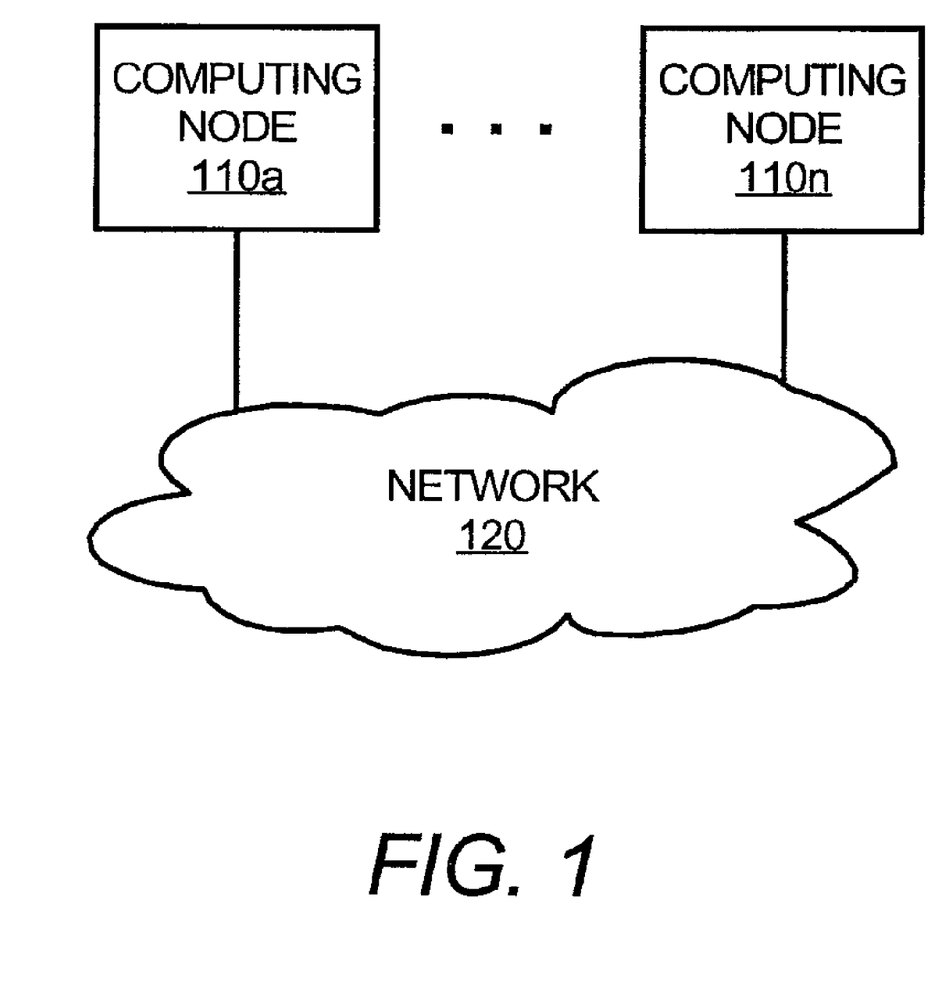
FIG. 1 illustrates a system, according to an embodiment.

FIG. 1 illustrates a system 100, according to an embodiment. The system 100 includes a plurality of computing nodes 110a-n connected via a network 120. The computing nodes 110a-n are computer systems. In one example, a computing node is a computer system running an OS and may include a server or a blade. The computer system may include but is not limited to at least one processor, memory and a NIC. Conventional virtualization technologies allow for virtual machines running on one or more servers. In another example, a computing node includes a virtual machine (VM) having an instance of an OS. For example, a server may host multiple VMs, where each VM each includes an OS. These VMs hosted by the server are computing nodes. Data transfers between the computing nodes 110a-n and over a network 120 include DP RDMAs.

Figure 2:
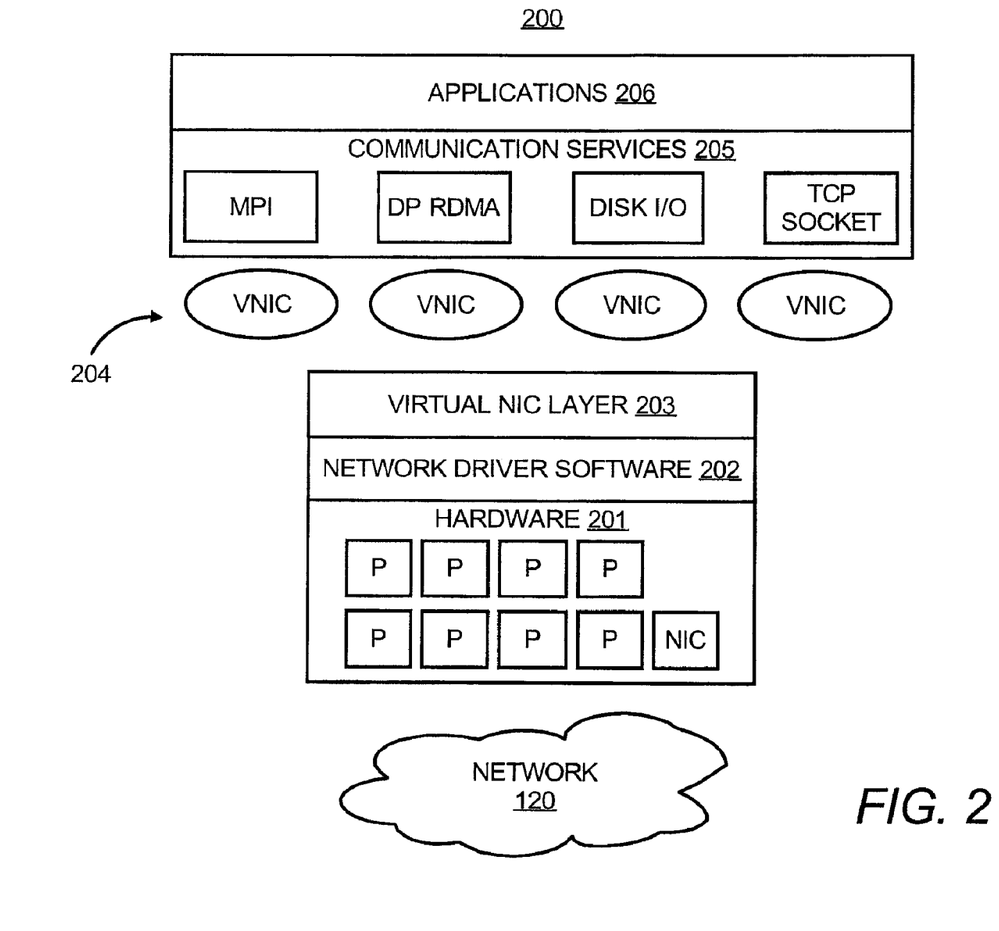
FIG. 2 illustrates a system architecture, according to an embodiment, showing hardware and software layers that may be implemented on a computing node.

The computing nodes 110a-n may be in a computing cluster, and the network 120 may include a fast local area network (LAN) comprised of a high-speed (e.g., 10 GB/s) Ethernet fabric, such as commonly provided in a data center. Each computer node is operable to use DP RDMAs to perform memory operations, such as get and put, for fast data transfer between the computing nodes FIG. 2 illustrates a system architecture 200, according to an embodiment, showing hardware and software layers that may be implemented on a computing node in the system 100. The system architecture 200 includes the network 120. On top of the network 120 is a hardware layer 201 including multi-core hardware for a computing node. For example, the computing node may comprise a multi-core chip including processors (CPUs), shown as P. The hardware includes a network interface controller (NIC). In one embodiment, the NIC includes an interface that allows the NIC to plug into a processor socket, which provides for direct communication with processors over an internal system bus. The NIC provides communication over the network 120.

Complex communications functionality is implemented in network driver software 202. This software is fabric-optimized to manage congestion and ensure the efficient yet reliable transport of data.

A virtual NIC (VNIC) layer 203 is software that provides functionality for applications 206 and communications services 205. VNICs 204 are shown, and provide a VNIC for each of the applications 206 and communication services 205 as needed. The VNICs 204 are interfaces (or VNIC APIs) that can be accessed by clients that utilize the services that are provided by the VNIC layer 203. Each VNIC client may obtain a unique interface, dedicated to that client, so that access to that interface is unaffected by accesses made by other clients through other VNIC interfaces. The VNIC layer 203, which sits on top of the layer comprised of the network driver 202, provides a reliable datagram service to VNIC clients 204. A VNIC client may be a user program or a kernel program that needs the communications services that are supported by the VNIC layer. The VNIC layer 203 provides a datagram service to transfer frames for conventional messaging as well as for DP RDMAs. A VNIC layer provides a one or more datagram interfaces. Each interface supports communications with multiple remote VNIC clients that are hosted on remote computing nodes. A more detailed description of the VNICs and other layers is described in co-pending U.S. patent application Ser. No. 11/553,976, filed Oct. 27, 2006, by Schlansker et al. and entitled "Virtual Network Interface System With Memory Management" and U.S. Patant application Ser. No. 11/326,918, filed Jan. 6, 2006 by Schlansker et al. and entitled "Architecture Allowing DMA Access To Unpinned Pages", both of which are incorporated by reference in their entireties.

The communication services 205 may include Message Passing Interface (MPI), which is a standard promulgated by the MPI forum, disk input/output (I/O), a TCP service, and a DP RDMA communication service. Each of these services is accessed through an interface that allows client applications to use the service. Each of these services is implemented, typically in software, using lower-layer services needed to implement that service. In one embodiment, the VNIC is a low-layer service that is used to implement higher-layer services. DP RDMA, for example, is a higher-layer service that is implemented using the VNIC service comprised of the VNIC interfaces and the VNIC layer implementation of the VNIC services. MPI is again a higher-layer service that is implemented using the DP RDMA service as well as VNIC service. The disk I/O service might also be implemented using the DP RDMA service as well as using the VNIC service. An application requested service can be provided through a service interface and uses lower-layer services that are invoked by the implementation of the requested service.

An application 206 may utilize DP RDMA either directly through the DP RDMA interface, or indirectly through the MPI or disk I/O interfaces which in turn use DP RDMA to implement the messaging and disk service requests. For example, a messaging request to the MPI interface may then use the DP RDMA communication service to perform an RDMA get or put to implement the MPI request. The actual transfer of frames for the DP RDMA is then performed by the VNIC layer 203. DP RDMA use the VNIC service to implement efficient, copy-free, high-bandwidth data transport.

Figure 3:
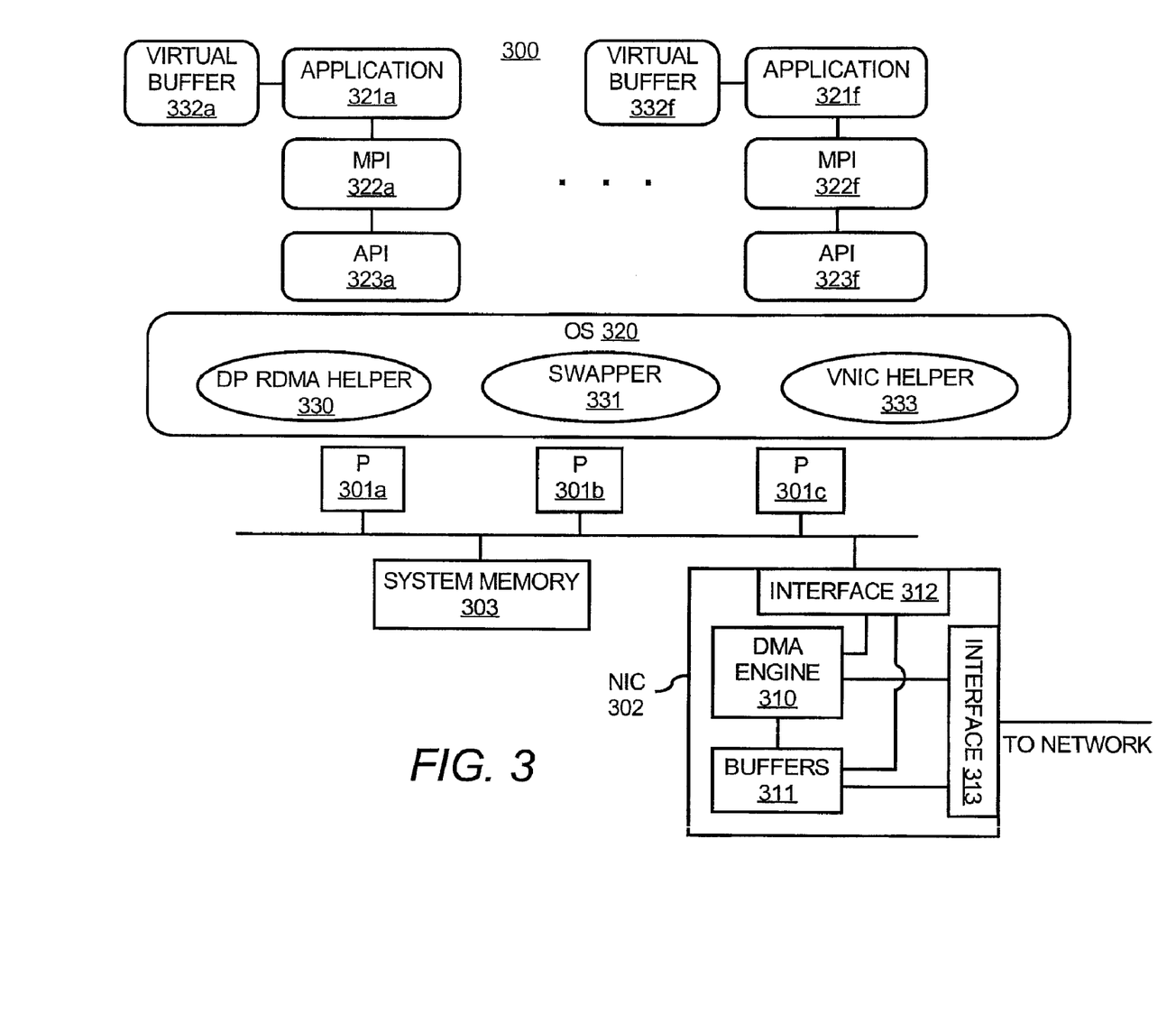
FIG. 3 illustrates a block diagram of a multi-core computing node, according to an embodiment.

FIG. 3 illustrates a block diagram of a multi-core computing node that may be used in the system 100 shown in FIG. 1, according to an embodiment. The computing node includes a multi-core computer system operable to perform DP RDMA and includes processors 301a-c, a NIC 302, system memory 303 and a system bus 304. The NIC 302 includes a DMA engine 310 and buffers 311 that are operable to be used to perform DP RDMA. In one embodiment, the NIC 302 is an FPGA-based GigE NIC that plugs into a processor socket that allows direct communication over the bus 304 with processors 301a-c and the system memory 303 which is physical memory. The NIC 302 is a fully compliant symmetric cache-coherent agent on the bus 304, so the NIC 302 can be accessed using coherent memory as opposed to PCI transactions. Residing on the bus 302 not only enables faster processor access to NIC registers, but also faster NIC access to system memory 303 when it DP DMAs packet data to and from the network. Note that the computer system is shown with three processors by way of example, and the computer may have more or less than three processors. Note that the NIC 302 includes interfaces 312 and 313 for connecting the NIC 302 to the bus 304 and the network, respectively.

Software is also shown for the computing node. The software includes an OS 320 and applications 321a-f. The applications 321a-f use MFIs 322a-f to provide an interface for communicating with other processes.

Application program interfaces (APIs) 323a-f provide interfaces between the applications 321a-f and processes running in the kernel of the OS 320, such as a DP RDMA helper 330 and a swapper 331. The DP RDMA helper 330 is the software that enables DP RDMA as well as other types of communications between computing nodes. The DP RDMA helper 330 decomposes data for a DP RDMA get or put request into local and remote sections and performs virtual-to-physical address translation for the data. The DP RDMA helper 330 also dynamically pins the local (receive-side) and remote (send-side) sections just prior to buffer access and unpins, i.e., releases, the local and remote sections just after access, as described above.

Also, the swapper 331 is configured to swap data, e.g., memory pages. For example, swapping in a page moves a specific virtual page that is stored on disk to an arbitrary physical page that has been freed through the normal virtual memory replacement process where infrequently used pages in main memory are swapped out to disk thus freeing pages for replacement with data that is needed for future use. After the data is swapped in, and data is pinned, a translation is established that identifies the correct virtual page to physical page mapping. The virtual page represents a virtual page in a virtual buffer (e.g., one of virtual buffers 332a-f), which is used for DP RDMA. The DP RDMA helper 330 accesses the mappings to perform virtual-to-physical address translation for the virtual buffer. After a page is pinned, this virtual to physical mapping can be safely used to identify physical addresses for control a hardware DMA.

A virtual buffer is a component of the DP RDMA client task. Thus, an array or data structure within an application can be established as a virtual buffer. Then a remote DP RDMA client, such as the DP RDMA helper 330, can get or put data to that buffer. Virtual buffers 332a-f are examples of virtual buffers for the applications 321a-f, which can be DP RDMA clients. Other DP RDMA clients may also have virtual buffers. For example, although not shown, the MPIs 322a-f may have virtual buffers.

The OS 320 also includes a VNIC helper 333 which implements the VNIC services. VNIC service requests are deposited into the VNIC interfaces, such as the VNICs 204 shown in FIG. 2, where the VNIC helper 333 processes those requests.

The DP RDMA helper 330 implements the DP RDMA services. DP RDMA services are requested through the DP RDMA interface (shown as APIs 323a-f) where the DP RDMA helper 330 implements those requests. In particular, the DP RDMA helper 330 is responsible for performing actions needed to satisfy DP RDMA requests. For example, if a long data transfer is requested using a DP RDMA get or put operation, the DP RDMA helper 330 identifies and pins local and remote sections as needed, and unpins local and remote sections as needed, throughout the course of that get or put operation. The DP RDMA helper 330 utilizes the capabilities of the VNIC layer to implement DP RDMA and perform these actions as needed.

The VNIC layer provides services including a datagram service that can move data from any source VNIC to any destination VNIC. VNIC operations include capabilities needed to move data by copying data through the VNIC API interface or data can be moved without software copies when a client references data indirectly through the VNIC API.

The NIC 302 includes a DMA engine 310 and buffers 311. The buffers 311 include command queues and buffers for storing data that must be sent to or received from the network. Message data is typically DMA'ed (copied in hardware) from a pinned page within a virtual buffer to the NIC buffer 311. It is held briefly in the NIC buffer 311 for transmission. The data is sent onto the network by the NIC 302 from the NIC buffer 311. When data is received it is held briefly in the NIC buffer 311 until it can be DMA'ed to a receiving virtual buffer. After data has been safely copied to the receiving virtual buffer, data within both the sending and the receiving NIC buffer can be discarded. If any transmission error occurs, data is retransmitted until data is successfully sent. The VNIC helper 333 uses the hardware DMA engine 310 to implement VNIC operations. In particular, when VNIC operations indirectly reference data, message data can be copied by the DMA engine 330 and not by software. This provides low-level VNIC operations that are needed by the higher-level DP RDMA client to implement copy-free data transport.

Figure 4:
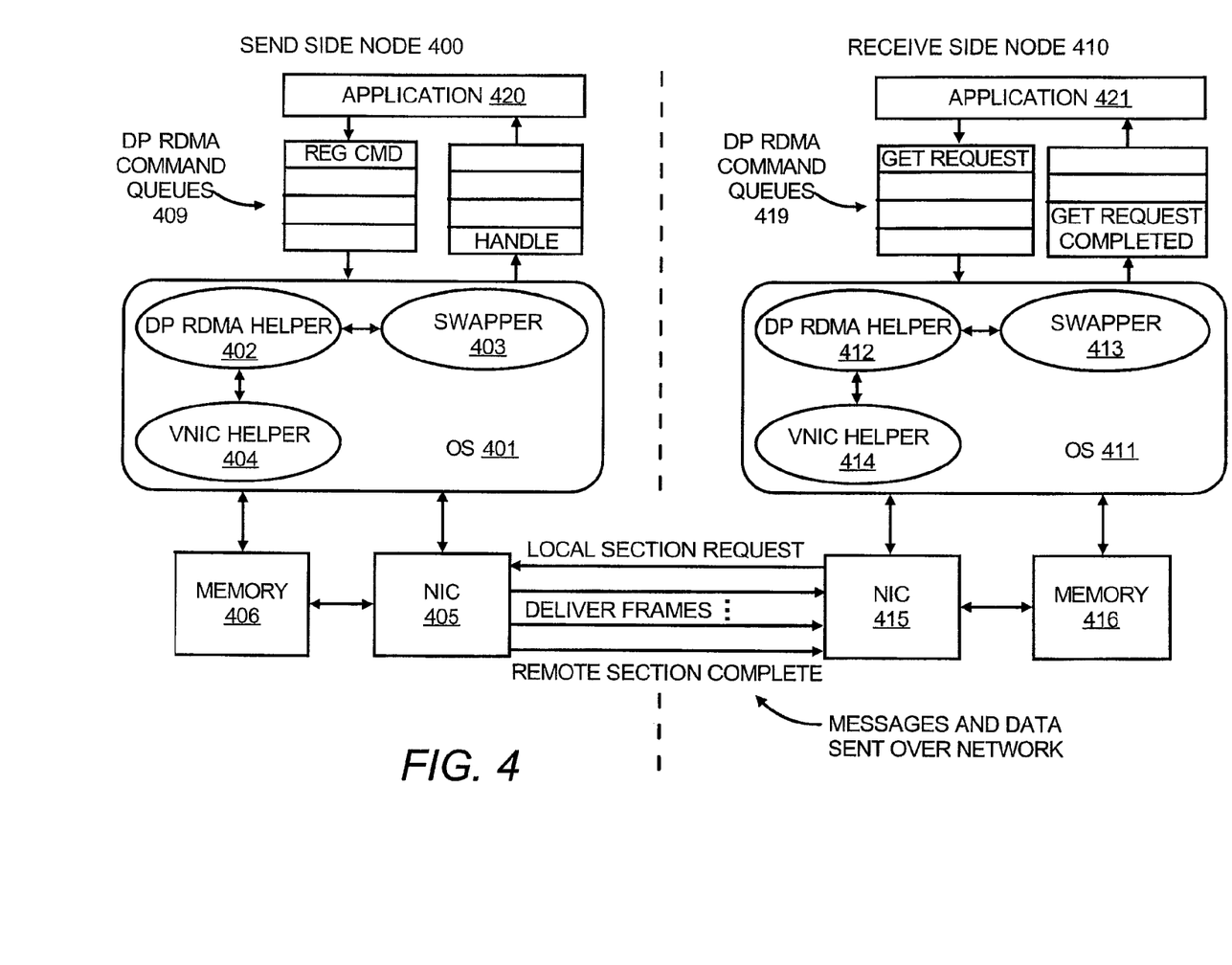
FIG. 4 illustrates a dynamic pinning (DP) RDMA for a get request, according to an embodiment.

FIG. 4 illustrates the processing of a DP RDMA get request, according to an embodiment. FIG. 4 shows a send side node 400 and a receive side node 410. The nodes 400 and 410 are computing nodes as described above. The send side node is sending data to the receive side node in response to a get request.

Each of the nodes 400 and 410 respectively includes a DP RDMA command queues 409 and 419, OS 401 and 411, DP RDMA helper, swap thread and VNIC helper 402-404 and 412-414, system memory 406 and 416, and DMA engine 405 and 415. The DP RDMA command queues are part of the DP RDMA interface (e.g., the APIs 323a-f shown in FIG. 3) and allow the insertion of new commands from a DP RDMA client and are used to report the completion of previous DP RDMA commands to a DP RDMA client. The command queues 409 and 419 are shown as comprising two queues, one for input to the DP RDMA helper 330 and one for output from the DP RDMA helper 330. As described above, insertion of new commands from a DP RDMA client, such as the application 420 or 421, go into the input queue, and output, such as a handle or report of completion of command, go into the output queue. For example, the get request may have been generated by the application 421 and put into the input queue.

Prior to executing a DP RDMA get or put request, a virtual buffer must be registered to allow remote access, by a DP RDMA command, to that buffer. An application 430, running on the send-side node 400, submits a registration command containing the virtual address and the length of the virtual buffer region that is to be registered. This is shown as REG CMD in the input queue of the queues 409 on the send side node 400. The DP RDMA helper 412 on the send side node 400 polls the queue 409 and identifies the registration command request. The DP RDMA helper 402 registers the virtual buffer on the send side node 400. For example, a handle, also referred to as a token, is created on the send side node 400 that names the process (process ID of the requesting task), a starting virtual address for the send side virtual buffer and the length, which can be a set of contiguous virtual addresses in the virtual buffer. The handle, shown in the output queue, is returned to the application 420 and is used by the application 420 to allow remote access into the application's virtual buffer, which is not shown but is part of the memory 406.

When this handle is submitted remotely (e.g. from the receive-node side) within a DP RDMA command then the corresponding process ID, starting virtual address, and length can be retrieved from a table in the helper so that the DP RDMA command can perform the requested action on this remotely accessed virtual buffer and ensure that the requested action is contained within the buffer (e.g. does nor read or write data outside the registered buffer). This registration does not pin the registered memory region and consumes only a small kernel table entry.

After registration, the handle is returned to the requesting application 420 through the output queue as shown and described above. The send-side application 420 then sends the handle (e.g. using conventional messaging) to a corresponding receive-side application 421 running on the receive side node 410. The application 421 on the receive side node 410 can now repeatedly use this handle, whenever desired, to perform get operations as needed to transfer data from the remote virtual buffer on the send side node 400 to a local virtual buffer on the receive side node 410.

The application 421 running on the receive side submits a get request into the DP RDMA command queue 419. This get request includes the handle that specifies the remotely accessed virtual buffer. The DP RDMA helper 412 on the receive side node 410 polls the queue 409 and identifies the get request. When the get command is processed by the DP RDMA helper 412 on the receive side node 410 the helper decomposes the data to be received for the get into local sections. Each local section is a subset of the target virtual buffer space for all the data that is specified in the get request. A size of a local section may be based on the amount of available memory in the system memory 416.

After determining a local section, the DP RDMA helper 412 sends a local section request to the send side node 400 via the NIC 415. The local section request specifies the handle, an offset for the virtual buffer on the send side node 400, a pointer to a virtual buffer on the receive side node 410, and a transfer length of the data to be transferred.

The local section request asks that all data needed to fill the local section portion of the target virtual buffer is sent. The data is sent one physical frame or packet (for example and Ethernet frame) at a time. The DMA engine in the NIC is used to copy data from its location within the pinned remote section into the NIC buffer. Note that the DMA engine and NIC buffer are shown in FIG. 3 for the NIC 302 and the NICs 405 and 415 have the same components at the NIC 302. Then data is sent, by NIC hardware, through the network from the sending NIC buffer to the network and from the network to the receiving NIC buffer. And finally data is DMA'ed from the receiving NIC buffer to its proper location within the receiving local section.

Each local section request asks for a specified amount of data from the remote node, which is the send side node 400 in this case. In order to send this data, a remote section must be formed on the send side node 400. This remote section may not be as large as the requested local section due to a lack of physical memory within the remote node. To get requested data, a remote section is formed (pinned) and multiple frames are transmitted until all needed data within that remote section is sent to the receiving local section. The remote section can then be unpinned and a new remote section is formed (pinned). Again frames are sent and the remote section is unpinned. This process repeats until all data needed to fill the requested local section is sent. Then, a remote section complete message is sent to the receive side node 410.

The memory on each node is only pinned for the time needed to transfer the data. For example, memory for the virtual buffer on the receive side node 410 is pinned just prior to sending the local request and is released after the local section is received. The amount of memory pinned is the amount of data to be received from the send side node (i.e., the size of the local section). Also, the memory corresponding to the virtual buffer on the send side node 400 is pinned just prior to the delivery of the frames, and is released after completion of the transfer. The amount of memory pinned on the send side node 400 is equal to or less than the local section depending on the amount of data transferred in each delivery, which may be less than a local section as described below. DMA hardware access is restricted to pinned data to prevent page relocation during a DMA. After transfer, a completion message is sent to the receive side node 410, and the receive side node 410 releases pinned pages.

As described above, after the send side node 400 receives the request for a local section, the send side node 400 can send less than the local section. For example, if the local section is 2 MB and assuming a memory page is less than 2 MB, the send side node 400 may pin, send, and release a page at a time until the 2 MB of data is transferred. Then, the transfer complete message is sent to the receive side node 410. The data transfers are direct memory accesses, so the DMA engine 405 puts the data into the memory 416 of the receive side node 410 without any need to copy the data in software by the DP RDMA helper 412 on the receive side node 410. While the receive side DP RDMA helper 412 does not copy actual data, it does receive, for each packet, a confirmation or completion signal, in the receiving VNIC, that data has been transmitted. After asking for a local section, the local DP RDMA helper 412 monitors the incoming completion signals and looks for a final frame that signifies that the requested local section transmission is complete. At this time, the entire local section has been sent and another local section request may be sent.

The VNIC helper 404 is responsible for interpreting single frame commands and sending the frames of data to the receive side node 410. For example, the VNIC helper 404 moves frame and puts the frames in the memory addresses of the memory 416 corresponding to the pinned physical memory region for the virtual buffer on the receive side node 410.

Figure 5:
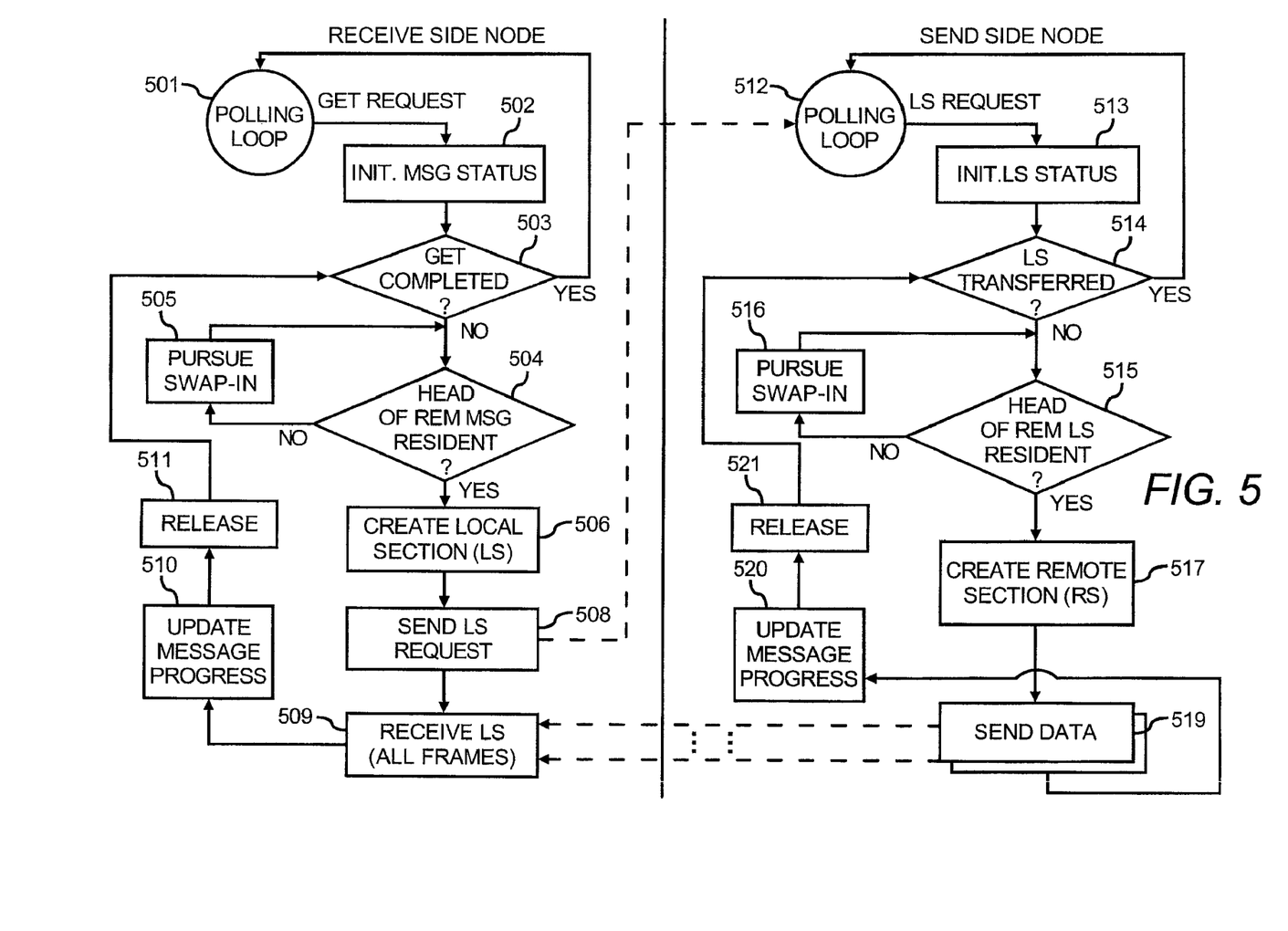
FIG. 5 shows a method for DP RDMAs with respect to a get operation, according to an embodiment.

FIG. 5 shows a method 500 for DP RDMAs with respect to a get operation, and is described with respect to FIG. 4 by way of example. It should be noted that the DP RDMA may be used for other types of memory operations, such as a put operation. In one embodiment, a put operation can be implemented by requesting that a remote node performs a get. Thus, the get operation presented here is a primitive that can be used to implement a put operation. Steps to implement a get operation for the receive side node and the send side node are shown in FIG. 5.

Note that a DP RDMA registration request is not currently shown in FIG. 5. It is assumed that prior virtual buffer registration request has been processed at the sending node. The handle was returned to the sending node DP RDMA client. The handle was then provided to the DP RDMA client application on the receiving side. The DP RDMA client on the receiving side formed a get request and included this handle within the get request. This get request was deposited into the DP RDMA command queue in order to initiate the get operation.

On the receive side node 410, at step 501, a command queue is polled and the get request is detected.

At step 502, a message status is initialized. The message status may indicate a beginning virtual address of the virtual buffer, the length of the virtual buffer, an indication that a get will be performed to this address and it will be of this length, and currently the get progress is at byte 0.

At step 503, a determination is made as to whether the get is completed. If the get is not completed, at step 504 a determination is made as to whether a head of a virtual buffer on the receive side node is resident in the physical memory addresses corresponding to the virtual buffer. The head for the receive side node is one or more pages of the virtual buffer for the receive side node that is available to receive data from the send side node.

If the head is not resident at step 504, then a request is made to the swapper 403 which swaps in needed pages at step 505. Note that for this request, the DP RDMA helper 402 processing continues working on other DP RDMA requests even before the requested swap in occurs.

If the head is resident at step 504, then a local section is created at step 506. Creating a local section includes determining the size of the local section. The size of the local section may be less than the total amount of data to be transferred for the get request. The size of the local section is determined based on resource availability, such as available memory. When resources are plentiful, a large local section is used. When resources are scarce, progress is ensured because only the head of the buffer and as little as a single page is used for the local section and can be temporarily pinned. Creating the local section also includes pinning the local section after the size is determined.

At step 508, a local request is sent to the send side node 400 that requests data for the pinned memory region. The local request indicates that the receive side node wants the local section starting from byte X and going to byte Y wherein the number of bytes is equivalent to the size of the local section.

On the send side node 400, the local request is received as a VNIC message and within a VNIC receive queue, which may be part of a VNIC client 204 shown in FIG. 2. The VNIC receive queue is polled at step 512, and the local request is identified.

At step 513, a local section status is initialized. The local section status represents the progress of local section transmission. Initially, the entire local section must be transmitted. As the send-side DS RDMA helper transmits portions of the local section, this status is updated so that, at each step, only a remaining portion is then sent until the entire local section is transmitted.

At step 514, a determination is made as to whether the local section is transferred. If the local section has not been transferred to the receive side node 410, a determination is made as to whether a head of a remaining remote section on the send side node 400 is resident in the physical memory addresses corresponding to the virtual buffer at step 515. The head is the next data to be transmitted. The data for the local section is transmitted sequentially. However, in other embodiments, the data may be transmitted out of order, so if a next contiguous set of data is not available, another set of data for the local section may be sent to the receive side node, for example, during a swap in. In these embodiment, a mechanism other than a simple counter is needed to keep track of the data that has been sent.

If the head is not resident, then the swap thread 413 swaps in needed pages at step 516. For example, the next data to be sent for the local section is retrieved from disk and put into memory.

If the head is resident at step 515, then a remote section is created at step 517. The remote section may be smaller than the local section depending on the availability of resources on the send side node 400. Creating the remote section includes pinning the remote section corresponding to size determined for the remote section, which may be smaller than the local section.

At step 519, the data is transferred to the receive side node 410. The data is transmitted in packets that are compatible with the low-level network technology. The progress of transfer of the local section status is updated at step 520, and the pinned remote section's pages are released at step 521. The local section status is consulted, and if data transferred to the receive side node 410 was less than the local section, then steps 514-521 are repeated until the entire local section is transferred.

On the receive side node 410, at step 509, the local section is eventually received. The progress of the get request is updated at step 501, and the local section's pinned pages are released at step 511. Then, steps 503-511 are repeated to create and receive local sections and steps on the send side node 400 are repeated until the get request is satisfied.

As described above, FIG. 5 shows steps for a get operation. In one embodiment, a put operation can be implemented by requesting that a remote node performs a get. For example, the send side node forms a put request to write data to the receive side node. The put request is transmitted to the receive side node. The receive side node interprets the put request as a get request to retrieve the data from the send side node. Then, the steps described above are performed to retrieve the data from the send side node using DP RDMA, and the put operation is accomplished.

One or more of the steps of the methods described herein and other steps described herein may be implemented as software embedded on a computer readable medium, such as the memory and/or data storage, and executed on a computer system, for example, by a processor. The steps may be embodied by one or more computer programs, which may exist in a variety of forms both active and inactive. For example, they may exist as software program(s) comprised of program instructions in source code, object code, executable code or other formats for performing some of the steps. Any of the above may be embodied on a computer readable medium, which include storage devices. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes.

While the embodiments have been described with reference to examples, those skilled in the art will be able to make various modifications to the described embodiments without departing from the scope of the claimed embodiments.

What is claimed is:

1. A system comprising:
   a processor;
   a dynamic pinning remote direct memory access helper on the processor core; and
   a network interface controller comprising:
   a network interface to connect the network interface controller to a second network interface controller on a remote computing node;
   a system bus interface to connect the network interface controller to the processor via a system bus;
   buffers usable as cacheable memory regions for the processor; and
   a direct memory access engine communicatively coupled to the dynamic pinning remote direct memory access helper via the system bus interface and to receive a request for data,
   the dynamic pinning remote direct memory access helper to:
   decompose the data to be transferred through a remote direct memory access into at least first and second remote sections, each of the first and second sections being less than an entire memory page;
   pin the first remote section until a first portion of the data from the first remote section is transferred to the remote computing node;
   after the first portion of the data is transferred, release the first remote section;
   after releasing the first remote section, pin the second remote section until a second portion of the data from the second remote section is transferred to the remote computing node; and
   after the second portion of the data is transferred, release the second remote section, wherein the first section is pinned at a first time and for a first duration sufficient to transfer the first section, and the second section is pinned at a second time for a second duration sufficient to transfer the second section.

2. The system of claim 1, wherein the system is implemented on a single chip and the processor comprises a processor core.

3. The system of claim 1, wherein the dynamic pinning remote direct memory access helper is to create local sections to receive second data decomposed into third and fourth remote sections on the remote computing node, and to sequentially pin and release each of third and fourth local sections separately as the second data is sequentially transferred into the third and fourth local sections; and
   the direct memory access engine is to perform a second remote direct memory access for each local section.

4. A system comprising:
   a dynamic pinning remote direct memory access helper in a kernel on a processor,
   for a request for data, the dynamic pinning remote direct memory access helper to:
   create at least first and second local sections to receive the data decomposed into at least first and second remote sections on a remote computing node,
   pin the first local section until a first portion of the data from the first remote section is received,
   after the first portion of the data is received, release the first local section,
   after releasing the first local section, pin the second local section until a second portion of the data from the second remote section is received, and
   after the second portion of the data is received, release the second local section; and
   a direct memory access engine to perform a remote direct memory access for each local section via the network interface until all of the data is received.

5. The system of claim 4, further comprising:
   a swapper in the kernel, wherein when a head of a remaining local section is not resident in memory, the swapper is to swap the head into memory.

6. The system of claim 4, further comprising a virtual network interface controller layer to provide a datagram service to receive frames of data for each local section.

7. The system of claim 4, further comprising a registered virtual buffer mapped to physical memory, each local section being in the virtual buffer.

8. The chip of claim 7, further comprising:
   system memory, at least one of the sections being a remote section of a send side node, the network interface controller to perform the remote direct memory access by retrieving the remote section from addresses in the system memory and transferring the remote section from the network interface controller to a network interface controller in a receive side node via a network.

9. The chip of claim 7, further comprising:
   system memory, at least one of the sections being a local section of a receive side node, and the region of memory is received at the network interface controller and stored in the local section.

10. The chip of claim 7, further comprising:
    a kernel on the processor core, the kernel including the dynamic pinning remote direct memory access helper.

11. The system of claim 4, wherein:
    the dynamic pinning remote direct memory access helper is to decompose second data to be transferred through a second remote direct memory access into third and fourth remote sections and to dynamically pin and release the third and fourth remote sections separately as the second data is transferred into the third and fourth remote sections; and
    the direct memory access engine is to perform the second remote direct memory access for each remote section via the network interface until the second data is transferred.

12. The system of claim 4, wherein the system is implemented on a single chip and the processor comprises a processor core.

13. A chip comprising:
    a processor core;
    a dynamic pinning remote direct memory access helper on the processor core; and
    a network interface controller communicatively coupled to the dynamic pinning remote direct memory access helper, the network interface controller to perform a remote direct memory access of a region of memory for a request for data, the dynamic pinning remote direct memory access helper to:
    decompose the region of memory into at least first and second sections,
    pin the first section until a first portion of the region of memory is accessed;
    after the first portion of the region of memory is accessed, release the first section;
    after releasing the first section, pin the second section until a second portin of the region of memory is accessed; and
    after the second portion of the region of memory is accessed, release the second section.

* * * * *

UNITED STATES PATENT AND TRADEMARK OFFICE
CERTIFICATE OF CORRECTION

PATENT NO.        : 8,131,814 B1
APPLICATION NO.   : 12/252173
DATED             : March 6, 2012
INVENTOR(S)       : Michael Schlansker et al.

It is certified that error appears in the above-identified patent and that said Letters Patent is hereby corrected as shown below:

In the Claims:

In column 12, line 14, in Claim 8, delete "chip" and insert -- system --, therefor.

In column 12, line 22, in Claim 9, delete "chip" and insert -- system --, therefor.

In column 12, line 27, in Claim 10, delete "chip" and insert -- system --, therefor.

In column 12, line 61, in Claim 13, delete "portin" and insert -- portion --, therefor.

Signed and Sealed this
Twenty-third Day of April, 2013

Teresa Stanek Rea
*Acting Director of the United States Patent and Trademark Office*